UNITED STATES PATENT OFFICE.

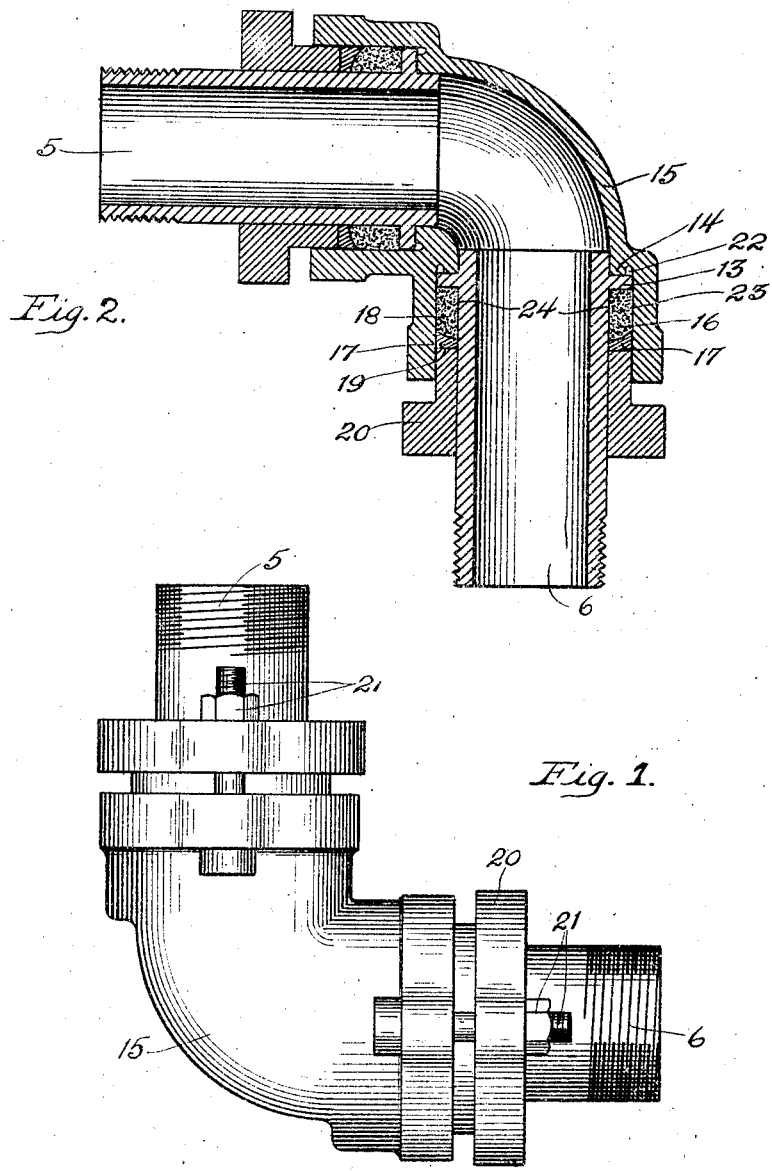

JOHN M. McDONALD, OF DUBUQUE, IOWA, ASSIGNOR TO A. Y. McDONALD MFG. CO., OF DUBUQUE, IOWA, A COPARTNERSHIP.

PACKED JOINT.

1,031,018.  Specification of Letters Patent.  Patented July 2, 1912.

Application filed November 22, 1910.  Serial No. 593,686.

*To all whom it may concern:*

Be it known that I, JOHN M. MCDONALD, a citizen of the United States, residing at Dubuque, in the county of Dubuque and State of Iowa, have invented certain new and useful Improvements in Packed Joints, of which the following is a specification.

The present invention relates more particularly to a joint adapted for use when it is desired to revolubly mount the pipe or other coupled member within the coupling member.

The object of this invention is to eliminate the major portion of the frictional resistance resulting from engagement of the packing with the walls of the coupling member when the coupled member is revolved within the coupling member.

Another object of the invention is to arrange one of these coupling members in such relation to a series of coupled members as to permit of a double movement of the free ends of the coupled members.

Further objects of the invention are, to provide a joint between the coupling and coupled members which is strong and durable, and well adapted to prevent leakage of liquid or other substance, and to permit of easy movement of the coupled member with respect to the coupling member; and to provide a well in the coupling member for the reception of a lubricant, thus insuring a constant lubricating of the packing of the joint.

The invention further relates to the features of construction and the combination of parts hereinafter described and claimed.

In the drawings, Figure 1, an elevation showing a coupling having two joints of the present invention embodied therein; and Fig. 2, a sectional elevation of the type of joint shown in Fig. 1.

In certain lines of work as, for instance, the unloading of tank cars it is necessary to swing the connection between the pipe leading to the storage tank and the pipe upon which is secured the nozzle that is to be inserted into the tank car, first, into position to bring said pipe into alinement with the opening in the tank car to secure the nozzle thereto, and then to depress the nozzle sufficiently to have it reach the lowermost portion of the tank on the car, this latter step being necessary in order to drain all of the oil from the tank. It is further necessary in devices of this kind to make a tight and efficient joint at the point of connection between the pipe carrying the nozzle and the pipe leading to the storage tank, and to so construct this joint that the pipe connected to the nozzle will be permitted to swing horizontally to bring the nozzle into alinement with the opening in the tank car, and then to move the pipe vertically to bring the nozzle to the bottom of the tank on the car.

Each coupled member which, as illustrated in the drawings, are pipes indicated by the numerals 5 and 6, is provided with a circumferential ring 13 adjacent the upper end thereof, which ring rests against a suitable abutment 14 formed on the interior of the coupling member, which, in the form shown, consists of a sleeve 15. Located below the ring 13 is a section of packing material 16, and below the packing material is a metallic collar 17, which, as shown more clearly in Fig. 2, is provided with a concave face 18, which rests against the packing. The opposite face 19 of the collar is flat and is engaged by a suitable gland 20, which is secured to the body of the coupling and adjusted to different positions by means of a nut and bolt connection 21, or other suitable fastening means.

A circumferential chamber 22 is provided in the body of the sleeve 15 and is located directly above the ring 13 of the coupled member. This construction is more clearly shown in Fig. 2. The chamber 22 is adapted for the reception of a suitable lubricant, which works down between the outer face of the ring 13 and the inner face of the sleeve 15, and keeps the packing lubricated at all times, thus maintaining the packing in the form of a lubricated mass which will reduce friction when the coupled member is turned within the sleeve. And this lubricant also serves to reduce the friction between the collar 13 and the walls of the sleeve 15 when said collar is revolved.

When the collar 17 is forced into tight engagement with the packing by the compression of the gland 20, it will result, owing to the concave formation of the face 18 of the collar which engages the packing, in the forcing of the packing away from the wall 23 of the sleeve 15. This is because of the concave formation of the face 18, which will tend to rowd the packing toward the center of the coupling and thus force it away from the wall 23 of the coupling member and into engagement with the wall 24 of the coupled member. This binding of the packing closer to the coupled member and forcing it away from the walls of the sleeve 15 results, when the coupled member is revolved, in carrying the packing around with the coupled member; and since the packing has, to a degree, been forced away from the wall 23, the frictional engagement between the packing and the wall 23 will be minimized to a great extent during such revolution. This will, of course, permit an easier and smoother revolution of the coupled member within the coupling member 15.

As will be seen in Fig. 2, the outer edge of the face 18 of the ring 17 is lying in a plane above the lower edge thereof. Thus the ring 17 extends a greater distance along the wall 23 than it does along the wall 24; consequently the amount of packing extending along the wall 23 is less than along the wall 24. This decreases the amount of frictional surface engaging the wall 23 and also decreases the amount of friction resulting when the coupled member is turned within the coupling member. It is, of course, understood that the ring 17 has a sliding fit within the sleeve 15 and that the frictional engagement of the ring with the wall 23 when the ring is revolved within the sleeve 15 is slight.

By providing a metallic ring resting against the end of the gland, all of the chafing resulting from the revolution of the packing upon the surface of the gland is eliminated, since two metallic surfaces are brought together at this point, in place of a metallic and a compressible surface. Thus, the friction resulting from the revolution of the coupled member within the coupling is reduced by a plurality of means, as follows: First, by forcing the packing away from the walls of the coupling member, which in the present instance is the sleeve 15, and into engagement with the coupled member, which in the present instance is either the revoluble pipe 5 or 6, and thus decreasing the amount of packing engaging the walls of the coupling member, and also preventing riffling of the packing against the walls of the coupling member as the coupled member is moved; second, by reducing the amount of packing engaging the walls of the coupling member in comparison to the amount of packing engaging the walls of the coupled member; third, by providing a constant lubrication for the packing, the packing does not become dry and hot and the friction from this source is eliminated, and a reduction in the friction is further brought about by the constant lubricating of the engaging walls of the coupling and coupled member; and fourth, by keeping the packing away from the gland, the friction which would result from the engagement of the packing with the gland is eliminated.

It will thus be seen that while a tight and compressed joint is maintained between the coupled member and the coupling member, at the same time this compression is of such a nature as to permit of an easy and smooth revolution of the coupled member within the sleeve without the frictional resistance which would ordinarily accompany such a construction. The packing and the coupled member will revolve in unison, since the packing is in tight engagement with the walls of the coupled member in comparison with its engagement with the wall 23 of the sleeve 15, and thus a packing is provided, which, although not fixedly attached to the coupled member, is held in sufficiently rigid engagement to revolve therewith, so that, in fact, a packed revoluble joint is maintained within the fixed coupling member, which in the present instance is the sleeve 15. And this engagement of the packing with the coupled member is further brought about by its being compressed against the face 18 of the ring 17 and against the face of the ring 13, both of which members will move with the coupled member.

From the foregoing description, it will be seen that a joint is provided which is sufficiently tight to prevent leakage, since the compression of the packing material by the tightening of the gland is sufficient to render the joint non-leakable; and at the same time the binding between the packing and the walls of the coupling member is eliminated to the extent necessary to permit of the revolution of the packing within the fixed member, without a binding resulting from the frictional engagement between the packing and the walls of the coupling member. It will also be seen that means are provided for maintaining the packing in sufficiently rigid engagement with the coupled member so that the coupled member and the packing are revoluble together, thus permitting of the revolution of the coupled member within the coupling member without revolving the coupled member against the frictional resistance of the packing, which would tend to render such revolution difficult, and would also tend to wear out the packing in a short while, producing a leaky joint. It is by means of this easy and smooth revolution that a joint is provided especially adapted for use where liquid is to be conducted from one receptacle to another, since, as heretofore explained, movement of this nature in two directions is usually necessary in order to properly perform such an operation.

I claim:

In a device of the class described, the combination of an elbow sleeve provided with interior shoulders extending at right angles to one another, pipe sections, each provided with flanges adapted to engage said shoulders, said shoulders being formed with grooves providing oil chambers, the ends of said pipes projecting beyond said shoulders and serving to hold the pipes against sidewise movement within the sleeve, a packing below each of said flanges, a ring below said packing provided with a concave face bearing against said packing, and a gland bearing against each of said rings, substantially as described.

JOHN M. McDONALD.

Witnesses:
F. A. REHDER,
B. WESTERCAMP, Jr.